Jan. 12, 1943.     D. H. CLEWELL     2,307,917
GRAVITY METER
Filed March 6, 1940
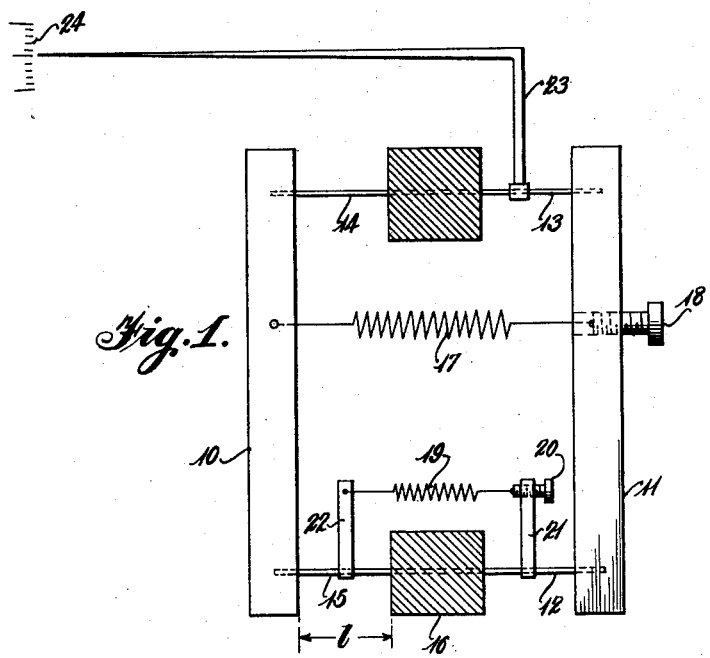
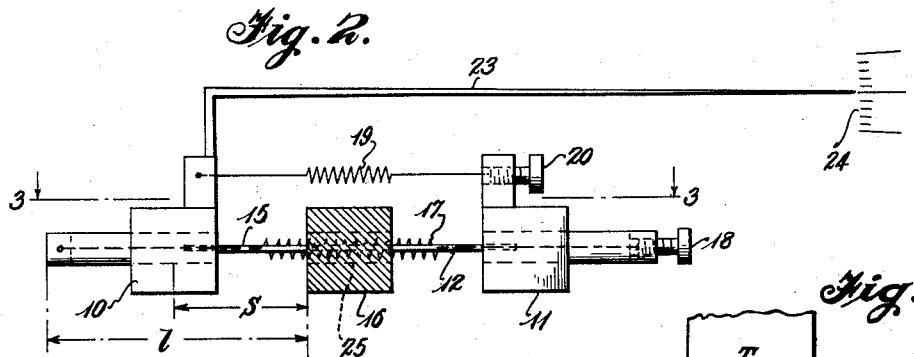
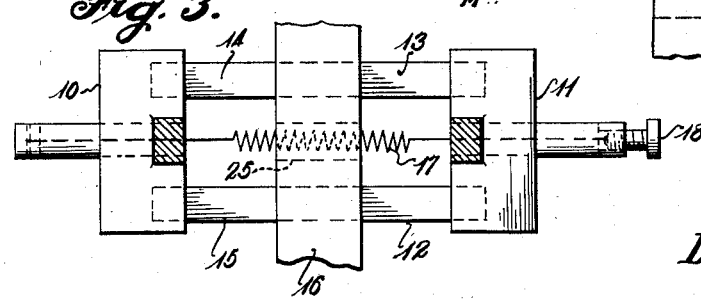
Inventor
Dayton H. Clewell
By
Meyer J. Burkhard
Attorney Patented Jan. 12, 1943

2,307,917

UNITED STATES PATENT OFFICE 2,307,917

GRAVITY METER

Dayton H. Clewell, Dallas, Tex., assignor, by mesne assignments, to Socony-Vacuum Oil Company, Incorporated, New York, N. Y., a corporation of New York Application March 6, 1940, Serial No. 322,496

5 Claims. (Cl. 265—1.4)

This invention relates to an apparatus whereby measurements of gravitational force, or variations in gravitational force, may be made from place to place over the earth's surface.

It is well known that the force of gravity varies over the surface of the earth in accordance with a number of factors, the most important of which being the differences in latitude and in the local structure of the earth's surface, either visible or in the substrata. Additionally, it is well known that the variations of gravitational force are closely connected with the variations of geological structures adjacent the surface of the earth. This known fact has been used in geophysical exploration for the location of mineral and oil deposits, the latter being affected by locating structures such as steep anticlines, faults or salt domes, which are generally associated with oil deposits. This is particularly true in the Gulf Coast region of the United States.

Various apparatus have been employed in the past for determining the value of gravitational force or its variations from point to point over the earth's surface, but all of these have been so cumbersome and have required so much time in the taking of readings that geophysical survey work by the use of the gravity meter has been materially handicapped. Among the apparatus heretofore employed is the use of the torsion balance which reacts in a peculiar way in response to the change in density of the substrata. This instrument in effect points out changes in density such as would be occasioned by the existence of a structure. These instruments, however, are quite expensive, cumbersome and very delicate in their adjustments and require considerable precision in handling.

An additional disadvantage in the use of the torsion balance in reconnaissance survey work is that a long period of time at each point is required for the taking of readings, which necessarily would limit the number of readings that could be made in a day.

Other apparatus heretofore employed made use of an ordinary gravity pendulum whose period of oscillation depended upon the force of gravity. The use of this type of apparatus, like the torsion balance, requires a long period of operation for sufficient accuracy in results.

It is the primary object of the present invention to provide an apparatus whereby geophysical exploration may be carried out in a rapid and accurate fashion.

Another object of the invention is the provision of an apparatus whereby small differences in the force of gravity amounting to no more than .001 of a dyne can be measured.

Still another object of this invention resides in the provision of a light, compact instrument by means of which, when set up on a particular location, the force of gravity can be read almost immediately and directly.

This invention also contemplates an instrument that is highly sensitive to gravitational forces, yet insensitive to level and stray forces such as magnetic fields.

Still another object of the invention is in the provision of an instrument whose readings when plotted against the displacement of the mass will form a linear function.

Other objects of the invention relating primarily to details of construction and operation whereby great accuracy and ready making of observations without loss of time may be effected will be apparent from the following description in conjunction with the drawing in which:

Figure 1 is a side view of one form of the improved gravity meter;

Figure 2 is a side view of a modification of the gravity meter shown in Figure 1;

Figure 3 is a sectional view of the instrument shown in Figure 2 taken along the line 3—3; and Figure 4 is a diagram illustrating the operation of the instant invention.

Referring to the drawings in detail, particularly Figure 1, vertically disposed bar type masses 10 and 11 are supported by leaf springs 12, 13, 14 and 15 in parallel relationship but on opposite sides of a central support 16. A coil spring 17 connects the two masses at points between their supports. The tension of the coil spring 17 may be varied to produce negative stiffness in the instrument by the adjusting screw 18 that is carried by the mass 11. The adjustment of the tension on the spring 17 to adjust the negative stiffness in the instrument effects an adjustment of its sensitivity. Vernier adjustments of vertical displacements can be made in the instrument by varying the tension in the spring 19 by adjusting means 20 that are connected to one end of the spring and carried by a support 21 that is mounted on the leaf spring 12 at approximately its central point. The other end of the spring 19 is secured to a second support 22 that is mounted on the leaf spring 15 at approximately its center. This vernier adjusting means is used to zero the instrument when it is desired to make a base station reading with which readings taken at other points throughout the area are to be compared. Indications of the vertical displacement of the masses due to gravitational forces acting upon them can be made directly by mounting a pointer 23 at a suitable point on either of the leaf springs 13 or 14, the end of the pointer being adapted to cooperate with the scale 24 to give the readings directly. If it is desired, a mirror can be mounted on either of the leaf springs 13 or 14 at its point of flexure, then by projecting a light on the mirror its reflection can be read directly on a scale or photographed.

The sensitivity of the apparatus is extremely high and remains practically constant for substantially all vertical displacements of the masses. This is shown as follows:

Consider Figure 4, which is a schematic drawing to illustrate in an exaggerated manner the disposition of the various components of the suspension for some particular value of gravity. The line MN represents a horizontal surface and it is assumed that sufficient tension has been given spring 19 to raise the masses 10 and 11 a slight distance, $\Delta h$, above their normal zero position which may be defined as the state wherein the flat leaf springs 12 to 15 are unstrained. The angle $\theta$ is the angle which a straight line, $l$, joining the two ends of any one leaf spring makes with the horizontal. Because the angle $\theta$ is greater than zero the tension T in spring 17 will exert a small upward component of force on the masses equal to $\Delta F$ where $$\Delta F = T \tan \theta$$

From the geometry of Figure 4 it is also evident that $$\tan \theta = \sin \theta = \frac{\Delta h}{l}$$

where $\theta$ approaches 0. Eliminating $\tan \theta$ by combining these two equations $$\frac{\Delta F}{\Delta h} = \frac{T}{l} = k$$

where $k$ is defined as the "negative" stiffness introduced into the suspension by the action of spring 17. The stiffness is termed "negative" because spring 17 tends to assist any vertical deflection of the masses in contradistinction to the other resilient members 12, 13, 14, 15, and 19 which act to resist any deflection of the masses. The positive stiffness of springs 12, 13, 14, 15 and 19 acting in unison my be defined as K in the equation $$\frac{-\Delta F_0}{\Delta h} = K$$

where $-\Delta F_0$ is the small force exerted downwards by the spring 12, 13, 14, 15, and 19 as a result of the deflection $\Delta h$. An increase in the weight of the mass due to a change in the force of gravity can be expressed as $$mg \cdot \frac{dg}{g}$$

where $g$ is the gravitational force and $m$ the sum of the two masses. This increase in force causes the masses to deflect a distance $dh$, until the resulting incremental spring force balances the change in gravity $$mg \cdot \frac{dg}{g} = dF_0 + dF = -Kdh + kdh$$

Solving for $dh$, the displacement which is a measure of the fractional change in gravity $$\frac{dg}{g},$$

$$dh = \frac{-mg}{K-k} \cdot \frac{dg}{g}$$

From this equation the gravity sensitivity, C, of the suspension, defined as the ratio of the deflection of the masses to the fractional change in gravity producing the deflection, is obviously equal to $$C = \frac{-mg}{K-k}$$

Since $$k = \frac{T}{l}$$

the sensitivity may be made very large by increasing the tension in spring 17 until $k$ is only slightly less than K. It is also to be noted that as long as the angle $\theta$ is very small the tension of spring 17 is practically independent of the deflection of the masses, a desirable feature of the suspension, since it results in a practically constant value for the sensitivity.

By placing the indicator on the point of flexure on either spring 13 or 14, its displacement is proportional to the vertical displacement of the masses.

There is shown in Figures 2 and 3 a modification of the instrument described in detail above. In these views as well as in Figure 1, similar elements will be referred to by like reference characters. In this embodiment of the invention, the masses 10 and 11 are disposed parallel to each other but on opposite sides of a central support 16 to which they are secured by means of leaf springs 12, 13, 14 and 15. In this embodiment of the invention the spring 17 that is connected between the central points of the two masses, passes through an opening 25 in the support 16 and functions in the same manner as described in connection with the embodiment disclosed in Figure 1. The supports for spring 19 in this modification differ from those shown in Figure 1 in that they are secured to the top of the masses 10 and 11. Adjustment of the tension on this spring is made in the same manner and for the same purpose as described in connection with Figure 1. In this form of the apparatus the indicator may be secured to the top of either of the supports for spring 19 or may be mounted at the point of flexure on either of the springs 12, 13, 14 or 15. The theory of operation of this gravity meter is the same as that given in connection with the gravity meter in Figure 1, except that the negative stiffness of spring 17 in this embodiment, $k$ is equal to $$\frac{dF}{dh} = \frac{Tl}{s^2}$$

where T is the tension in spring 17, $l$ the distance from the support to the outermost point on the mass and $s$ the distance from the support to the center of the mass. The sensitivity c of this apparatus can also be defined by the expression $$\frac{-mg}{K-k}$$

and can be varied in the same manner as that described in connection with Figure 1.

It is obvious to those skilled in the art that any suitable temperature control means may be employed with either form of this apparatus and that the conventional optical systems may be used for measuring the displacement of the masses.

The detailed circuits of the various elements used in the process and apparatus above have not been specifically described inasmuch as they are commonly known and may be varied within relatively wide ranges without departing from the principles of this invention.

I claim:

1. An instrument for geophysical prospecting that provides means for measuring the force of gravity or variations of the force of gravity over a given area, that comprises a support, a pair of masses, resilient means for securing the masses to opposite sides of the support so that the masses are held in equilibrium with the force of gravity and are free to move about the equilibrium point in short, slightly convergent, substantially vertical paths, a substantially horizontal tension member connected to the two masses and attracting one toward the other with a force sufficient to introduce a negative stiffness factor that nearly cancels the positive stiffness of said resilient means and thereby introduces a high sensitivity of the system to changes in the force of gravity, and means indicative of position of at least one of the masses.

2. An instrument for geophysical prospecting that provides means for measuring the force of gravity or variations of the force of gravity over a given area that comprises a pair of masses, supporting means for said masses, substantially horizontally and oppositely disposed resilient means for securing said masses to said supporting means, elastic means for connecting the masses and urging them toward each other in such a manner that the masses will occupy a position such that the resilient means will be flexed upwardly out of the horizontal plane, and means for indicating the displacement of the masses due to the gravitational forces acting on them.

3. An instrument for geophysical prospecting that provides means for measuring the force of gravity or variations of the force of gravity over a given area that comprises a pair of parallel masses, supporting means for said masses, substantially horizontally and oppositely disposed resilient means for securing said masses to said supporting means, elastic means for connecting the masses and urging them toward each other in such a manner that the masses will occupy a position such that the resilient means will be flexed upwardly out of the horizontal plane, and means for indicating the displacement of the masses due to the gravitational forces acting on them.

4. An instrument for geophysical prospecting that provides means for measuring the force of gravity or variations of the force of gravity over a given area that comprises a pair of parallel masses, supporting means for said masses, substantially horizontally and oppositely disposed resilient means for securing said masses to said supporting means, elastic means for connecting the masses and urging them toward each other in such a manner that the masses will occupy a position such that the resilient means will be flexed upwardly out of the horizontal plane, means for adjusting said elastic means, and means for indicating the displacement of the masses due to the gravitational forces acting on them.

5. An instrument for geophysical prospecting that provides means for measuring the force of gravity or variations of the force of gravity over a given area that comprises a pair of parallel masses, supporting means for said masses, substantially horizontally and oppositely disposed resilient means for securing said masses to said supporting means, elastic means for connecting the masses and urging them toward each other in such a manner that the masses will occupy a position such that the resilient means will be flexed upwardly out of the horizontal plane, means for adjusting said elastic means, a second elastic means cooperating with said first elastic means, means for adjusting the second elastic means to effect a vernier adjustment of the displacement of said masses, and means for indicating the displacement of the masses due to the gravitational forces acting on them.

DAYTON H. CLEWELL.